June 12, 1962 W. WHALEY 3,038,618
CONTROL SYSTEMS FOR LOADING MACHINES
Filed Dec. 3, 1959 3 Sheets-Sheet 3
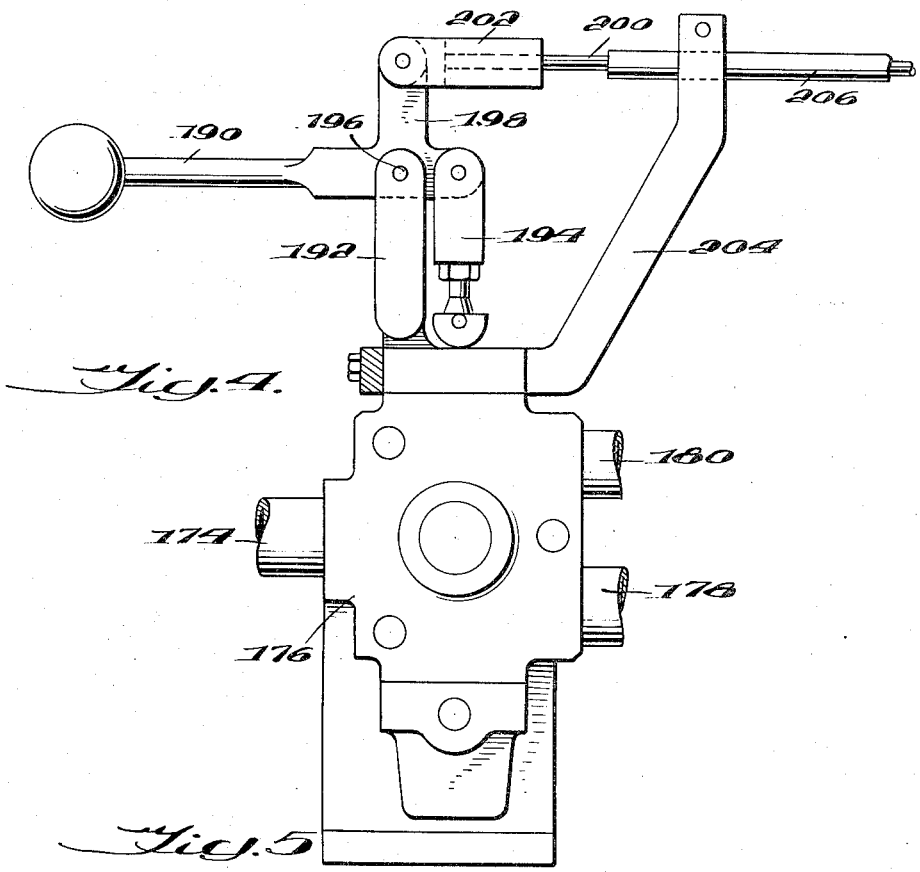
Fig. 4.
Fig. 5.
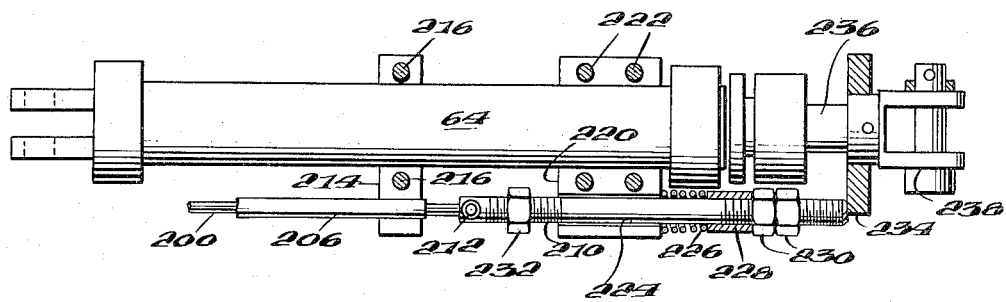
INVENTOR
WILLIAM WHALEY,
BY *[signature]*
ATTORNEYS

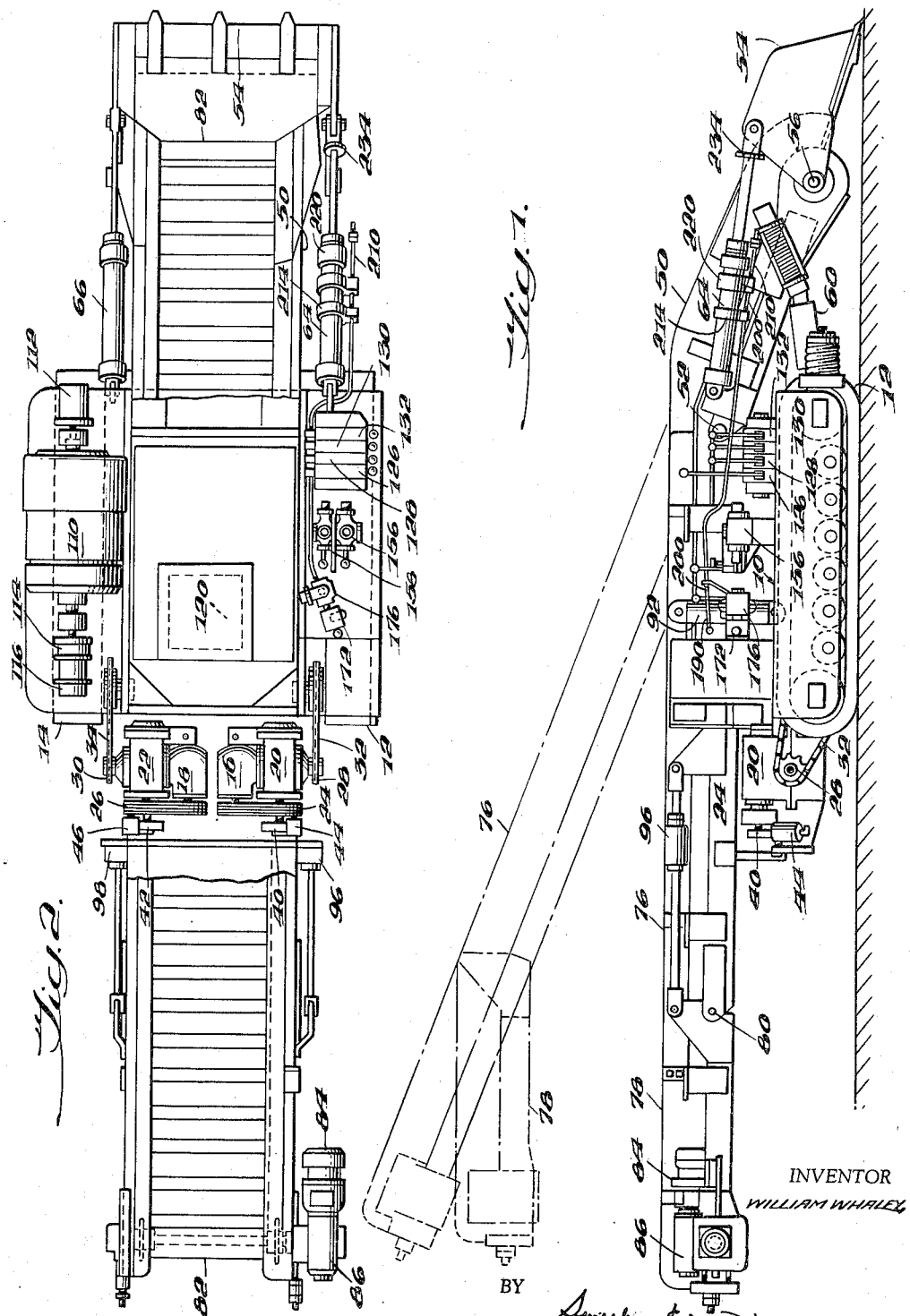

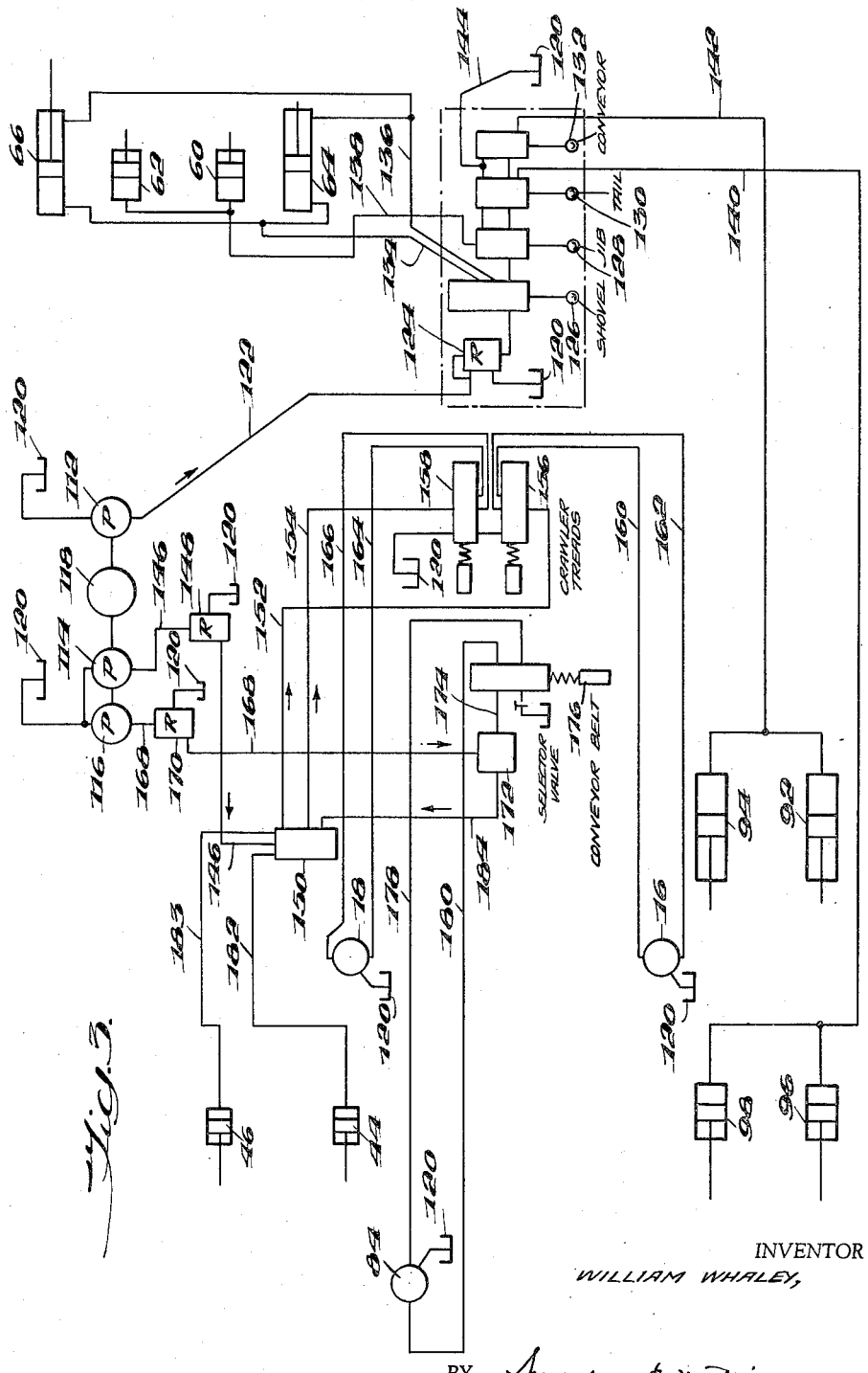

United States Patent Office 3,038,618
Patented June 12, 1962

3,038,618
CONTROL SYSTEMS FOR LOADING MACHINES
William Whaley, P.O. Box 789, Knoxville, Tenn.
Filed Dec. 3, 1959, Ser. No. 857,189
8 Claims. (Cl. 214—91)

This invention relates to control systems for loading machines, and more particularly to a fluid pressure control system for conveyor-type loading machines.

The control system described hereinafter is adapted for use generally in loading machines of the type employed in the mining industry for loading into mine cars and other conveyors coal, loose rock, and such lading, for transportation to a remote point for dumping or discharge.

Loading machines of this type have been described in my earlier Patents No. 940,999, dated November 23, 1909; No. 1,379,428, dated May 24, 1921; No. 1,814,067, dated July 14, 1931; No. 2,437,629, dated March 9, 1948; and No. 2,788,076, dated April 9, 1957.

This application is a continuation-in-part of my prior application for Loading Machines, Serial No. 608,998, filed September 10, 1956, now Patent No. 2,933,142; and my prior application for Vehicle Control Systems, Serial No. 694,343, filed November 4, 1957, now Patent No. 2,994,393.

These loading machines usually employ a main frame supported upon crawler devices for transport of the machine. On the front end of the main frame is mounted a jib which supports a shovel at the forward end thereof. A conveyor mechanism extends rearwardly from the main frame and employs an endless belt for carrying the lading from the shovel back to the conveyor tail or discharge portion from which the lading can be dropped into suitable conveying means, such as mine cars, transport vehicles, endless conveyors, and the like.

Such loading machines must be capable of operation in places having limited headroom and limited turning area. They must be sufficiently maneuverable to negotiate sharp turns and slight grades, and be powerful enough to handle heavy loads.

One object of this invention is to provide, for the type of loading machines described above, a control system which is relatively simple in construction and sufficiently compact so that the loading machines may be constructed to certain desirable dimensions.

Another object of this invention is to provide a control system which is conveniently manipulated by the operator so as to give him ready control over the functions of the loading machines and allow him to maneuver easily the loading machine.

Another object of this invention is to provide a control system wherein the power used to drive the conveyor mechanism can be diverted to the crawler device so that the travelling speed of the loading machine can be increased when the conveyor mechanism is not being operated.

These objects may be accomplished, according to one embodiment of the invention, by operating a loading machine completely by fluid pressure means, wherein the loading machine is provided with: a crawler device powered by fluid motors, brakes controlled by fluid motors, a jib which is adjusted vertically by fluid pressure operated cylinders, a shovel operated by fluid pressure cylinders, a conveyor mechanism which is adjusted vertically by fluid pressure cylinders, an endless belt which is driven by a fluid motor, and a conveyor tail portion which is adjusted by fluid pressure cylinders.

The fluid pressure is supplied by pump means driven by an electric motor. The fluid pressure is conducted to the various cylinders and fluid motors by suitable lines having therein valve means that can be manipulated selectively by the operator for carrying out the various functions of the loading machine.

A selector valve in one of the lines can be adjusted to direct a supply of fluid pressure to the motor which drives the endless conveyor belt. When the belt is not being used, the selector valve can be adjusted to direct the supply of fluid pressure to the motors which drive the crawler devices in order to drive the crawler treads at high speeds and thereby increase the travelling speed of the loading machine.

The conveyor belt can be operated by an inching-control device which is actuated automatically in response to movement of the shovel. When the inching-control device is in use, each time that the shovel is drawn backwards to dump material onto the belt, the belt is driven, and when the shovel is moved forward to be filled with material the belt is stopped.

This embodiment of the invention is illustrated in the accompanying drawings in which:

FIG. 1 is a side elevation view of the loading machine which employs the control system of this invention, and showing in broken lines the conveyor and conveyor tail portion in adjusted positions;

FIG. 2 is a plan view corresponding to FIG. 1;

FIG. 3 is a diagram of the control system of this invention; and

FIGS. 4 and 5 are enlarged views showing in detail the inching-control device.

The loading vehicle or loading machine, as illustrated in FIGS. 1 and 2, has a main frame 10 supported by a crawler device employing two identical tread devices 12 and 14 located at opposite sides of the machine. The tread devices 12 and 14 have driven endless tracks for moving the entire loading machine over the supporting surface.

Mounted on the rear of the main frame 10 there are hydraulic motors 16 and 18 which drive gear reducers 20 and 22 through chains 24 and 26, respectively. Gear reducer 20 is provided with a sprocket 28 for driving the tread 12 through a sprocket chain 32. Similarly, the gear reducer 22 is provided with a sprocket 30 for driving the tread 14 through a sprocket chain 34.

The hydraulic motors 16 and 18 are actuated independently of one another, but are operated in unison in order to drive the respective treads either in a forward or reverse direction.

The gear reducer 20 is provided with a brake mechanism 40, and the gear reducer 22 is provided with a brake mechanism 42. The brakes 40 and 42 are controlled by fluid pressure operated brake motors 44 and 46, respectively. Springs in the brakes 40 and 42 apply the brakes and hold the brakes applied automatically. The motors 44 and 46 act against the force of the springs to release the brakes.

When fluid pressure is supplied to the motor 16, in order to drive the tread 12, fluid pressure is also supplied to the brake motor 44 to act against the force of the spring, whereupon the brake motor 44 will release the brake 40. Similarly, when fluid pressure is supplied to the motor 18, in order to drive the tread 14, fluid pressure is also supplied to the brake motor 46 to act against the force of the spring, whereupon the brake motor 44 will release the brake 42.

The crawler devices and driving mechanism therefor are more fully disclosed in my copending applications, Serial No. 608,998, filed September 10, 1956, and Serial No. 694,343, filed November 4, 1957, and the brake arrangement is disclosed in my copending application, Serial No. 694,343, filed November 4, 1957.

At the front of the loading machine, there is an adjustable jib section 50 pivotally mounted at 52 on the main frame 10. A loading shovel 54 is pivotally supported by the forward portion of the jib 50 as indicated at 56.

The jib 50 can be vertically adjusted about the pivot 52 by means of hydraulic cylinder members 60 and 62 operatively connected at one end to the main frame 10 and at the other end to the jib 50.

The shovel 54 is operated by hydraulic cylinder members 64 and 66 which are connected at one end to the jib and at the other end to the shovel.

The cylinder members 60, 62, 64 and 66, and the cylinder members referred to below, may be of any well known type which can be extended or retracted in response to the action of fluid pressure, either hydraulic or gas.

A conveyor section 76 is mounted for vertical adjustment on the main frame 10 and extends from the jib 50 rearwardly of the main frame, and has a tail or discharge portion 78 which pivots on the main conveyor section at 80.

An endless belt 82 extends from the jib 50 to the tail portion 78 and is driven by an hydraulic motor 84 through a gear reducer 86 which are mounted upon the tail portion 78.

Vertical adjustment of the conveyor 76 with respect to the main frame 10 is controlled by hydraulic cylinders 92 and 94. Adjustment of the tail portion 78 with respect to the main conveyor section is controlled by hydraulic cylinders 96 and 98.

Various positions which the conveyor 76 and tail portion 78 may assume, are illustrated in FIG. 1. Adjustment of the conveyor and the tail portion may be made to account for the height of the mine car or conveyor which will receive the lading and also the slope of the ground surface over which the loading machine must travel.

The control of the various fluid motors and cylinders of the loading machine is achieved by pump means, valve means and fluid supply lines which are diagrammatically illustrated in FIG. 3.

Fluid pressure for actuating the various motors and cylinders is supplied by pumps 112, 114 and 116, which are driven by an electric motor 118. An hydraulic fluid supply tank is designated throughout FIG. 3 by reference numeral 120.

The pump 112 draws fluid from the tank 120 and supplies it under pressure by means of a supply line 122, through a pressure regulator 124, to a shovel control valve 126, a jib control valve 128, a tail portion control valve 130 and a conveyor control valve 132.

The valve 126 can be moved to a first position so that fluid will pass through the valve into a line 134 and into the rear of the shovel cylinders 64 and 66 to extend them so that the shovel 54 will move to the position illustrated in FIG. 1. The valve 126 can be moved to a second position whereby fluid will pass into line 136 and into the forward end of the shovel cylinders 64 and 66 so that the cylinders can be retracted to pull the shovel 54 rearwardly. The valve 126 may also be moved to a third or neutral position so that fluid will not pass through the valve to the cylinders 64 and 66, but will pass through the valve to the tank 120.

The cylinder members 64 and 66 are double acting, i.e., fluid pressure can act on either side of the pistons to extend or retract the cylinder members. The cylinders 64 and 66 can pull back the shovel 54 to dump the lading into the belt 82 and can push the shovel 54 forward into position to obtain a shovel full of lading.

The valve 128 may be moved to a first position to allow fluid to pass through a line 138 into the jib cylinders 60 and 62. When fluid is introduced into the cylinders 60 and 62, they will be extended, thereby raising the forward end of the jib 50. By moving the valve 128 to a second position the fluid may be retained in the cylinders 60 and 62 to keep them extended. When fluid is relieved from the cylinders 60 and 62 by moving the valve 128 to a third position, the forward portion of the jib 50 will drop.

The valve 130 can be moved to a first position to introduce fluid through a fluid line 140 into the tail cylinders 96 and 98 to adjust the conveyor tail portion 78 with respect to the conveyor 76. The valve 130 can be moved to a second position to hold the fluid in the cylinders 96 and 98, or to a third position to relieve the fluid from the cylinders.

The valve 132 can be moved to a first position to introduce fluid through a fluid line 142 into conveyor cylinders 92 and 94 in order to raise the conveyor 76, to a second position to hold the fluid in the cylinders, or a third position to relieve the fluid from the cylinders so that the conveyor 76 may be lowered.

The cylinders 60 and 62, 92 and 94, 96 and 98, are single acting. Fluid under pressure is introduced into one end of the cylinders so that the jib 50, the conveyor 76, and the tail portion 78 are moved in one direction by hydraulic pressure and are moved in the other direction by gravity when fluid is relieved from the cylinders. Hydraulic fluid may return from valves 126, 128, 130, and 132, to the tank 120 by means of a suitable return line such as the line 144.

The pump 114 draws fluid from the tank 120 and supplies it under pressure into a supply line 146, through a pressure regulator 148, to a distributor 150. From the distributor 150 fluid passes through the lines 152 and 154 to crawler control valves 156 and 158, respectively.

The valve 156 can be moved to a first position to allow fluid to pass through a line 160 to the tread motor 16 to rotate the motor in one direction which will drive the tread 12 forward. Also, the valve 156 can be moved to a second position so that fluid passing through a line 162 can rotate the motor 16 in the opposite direction to drive the tread 12 in a reverse direction.

The valve 158, which is identical to the valve 156, can be moved to a first position to allow fluid to pass through a line 164 to the tread motor 18 to rotate the motor in one direction which will drive the tread 14 forward. Also, the valve 158 can be moved to a second position so that the fluid passing through a line 166 can rotate the motor 18 in the opposite direction to drive the tread 14 in a reverse direction. The valves 156 and 158 can be moved to a third position so that fluid will not pass through the valves to the motors 16 and 18, but will be by-passed through the valves to the tank 120.

A line 182 extends from the distributor 150 to the brake motor 44, and a line 183 extends from the distributor 150 to the brake motor 46.

When the valve 156 in the line 152 is open to allow fluid to flow through it to the motor 16, there will be a build-up pressure in the distributor 150 due to the fact that the motor 16 resists or retards the flow of the fluid. This rise in fluid pressure in the distributor 150 will cause a corresponding rise in pressure in the line 182. The pressure build-up will be transmitted to the brake motor 44, and will be sufficiently high to allow the brake motor 44 to overcome the force of the spring and release the brake 40.

Similarly, when the valve 158 in the line 154 is open, pressure will build up in the distributor 150 and the line 183 and be transmitted to the brake motor 46 to overcome the force of the spring and release the brake 42.

When the valves 156 and 158 are closed, fluid will flow through the valves and back to the tank 120, by-passing the motors 16 and 18. Because there is little resistance to the flow, the pressure of the fluid will be low. When the valves 156 and 158 are open, the motors 16 and 18 will maintain a high pressure on the fluid because it must flow through the motors before returning to the tank 120. Therefore, when the motors are operating, the hydraulic pressure will be high and when the motors are stopped the hydraulic pressure will be low. This increase and decrease of pressure in the lines 152 and 154 is transmitted to the motors 44 and 46, and accordingly, an increase in pressure will release the brakes 40 and 42, and a decrease in pressure will allow the springs to apply the brakes.

The pump 116 draws fluid from the tank 120 and introduces it under pressure through a line 168 having a pressure regulator 170 into a selector valve 172. From the selector valve 172 fluid passes by means of a line 174 to a conveyor belt control valve 176.

The valve 176 can be moved to a first or to a second position to introduce fluid into a line 178 or a line 180 to drive the motor 84 and the belt 82 either in a forward or reverse direction. The valve 176 can be moved to a third or neutral position so that fluid will not pass to the motor 84 and the belt 82 will be stopped. The fluid is then by-passed to the tank 120.

The valve 176 can be operated by an inching-control device which is actuated automatically in response to movement of the shovel 54. A lever 190 (FIG. 4) which operates the valve 176 is attached to the top thereof by two links 192 and 194 so that the lever 190 can pivot at 196 above the top of the link 192 and operate the valve 176 through the link 194. The lever 190 has an arm 198 to which is fastened a cable 200 by means of a clevis 202. A bracket 204 extends upwardly from the valve 176 and firmly supports a cable casing 206 through which the cable 200 can slide.

The cable 200 extends from the valve 176 adjacent to the shovel cylinder 64 where it is attached to the end of a rod 210 (FIG. 5), as by screws 212.

A clamp 214 firmly supports the end of the casing 206. The clamp 214 is made up of two members which surround the cylinder 64 and are drawn together by bolts 216 in order to fix the clamp 214 to the cylinder 69 and hold the casing 206. Only one of the two members is shown in FIG. 5. A second clamp 220, which is similar to the clamp 214, is fixed to the cylinder 64 by bolts 222. The two members (only one is shown) which make up the clamp 220 have semi-cylindrical grooves therein which cooperate to form a guide hole 224 which is parallel to the cylinder 64 and through which the rod 210 can slide.

A compression spring 226 and a sleeve 228 surround the rod 210. A pair of jam nuts 230 are threaded on the rod 210 and adjusted against the sleeve 228 so as to put the spring 226 under compression, whereby the spring 226 will bear against the side of the clamp 220 and exert sufficient force on the sleeve 228 and the jam nuts 230 to move the rod 210 and the cable 200 to the right, as viewed in FIG. 5. This movement of the rod 210 is limited by a stop nut 232 which engages the clamp 220.

A circular-shaped block 234 is secured to the outside end portion of the cylinder rod 236, for example, by fixing it to the clevis 238 which is at the extreme end of the cylinder rod 236. The block 234 extends far enough to the side so that it can engage the end of the rod 210. The jam nuts 230 and the stop nut 232 can be adjusted along the rod 210 in order to control the extent of the movement of the rod 210.

The inching-control device operates as follows: When the shovel 54 is pulled to the rear by the cylinders 64 and 66 to dump material onto the conveyor belt 82, the cylinder rod 236 will travel rearwardly, and accordingly the block 234 will engage the end of the rod 210, thereby moving it to the left, as viewed in FIG. 5, and, at the same time, compressing the spring 226. This movement of the rod 210 will move the cable 200 which in turn will move the lever 190 so as to open the valve 176 to allow fluid to flow to the motor 84 so that the belt 82 will be driven to carry material from the shovel 54 to the tail portion 78. When the shovel 54 is moved forwardly to be filled with material, the block 234 will disengage the rod 210 so that the spring 226 can move the rod 210 and the cable 200 to the right, as viewed in FIG. 5. This movement of the rod and cable will move the lever 190 to a neutral position so that the belt 82 will be stopped.

In this manner, the belt 82 is driven each time the shovel is moved backwards to dump material on the belt, and the belt is stopped when no material is being dumped onto it. By operating the belt 82 only during the interval when the material is falling onto it from the shovel 54, the belt can be loaded along its entire length.

The lever 190, in addition to being moved by the cable 200, can be moved manually by the operator.

When the loading machine is being used to load material onto a mine car or conveyor means, the selector valve 172 will be adjusted so that fluid in the line 168 will flow into the line 174 and then to the motor 84 to drive the belt 82.

When it becomes necessary to move the loading machine to a new location, it is desirous that the crawler treads be capable of moving the loading machine with greater speed than is ordinarily available during the loading process. An increase in the speed of the treads can be obtained by using the fluid pressure from the pump 116 in addition to the fluid pressure from the pump 114 for driving the tread motors. To achieve this, the selector valve 172 can be adjusted to shut off the flow of fluid to line 174, and instead, direct the fluid from the line 168 into a line 184 leading to the distributor 150. From the distributor 150 the fluid is directed in to the lines 152 and 154, together with the fluid from the line 146. By this means, both pumps 114 and 116 can supply fluid under pressure to the tread motor 16 and 18 and thereby greatly increase the travelling speed of the loading machine. When the selector valve 172 is in this position, the conveyor belt 82, of course, cannot be used.

The distributor 150 and the valves used in the control system may be of any conventional construction suitable for performing the functions indicated.

The hydraulic equipment as shown in FIG. 3 is mounted on the loading machine in order to present an unobstructed top surface for the main frame 10 to receive the loading and conveying equipment. The motor 110 and the pumps 112, 114 and 116, are mounted at one side of the main frame 10 and the tank 120 is mounted below the top surface of the main frame between the treads. All of the control valves are located at one side of the main frame, as shown in FIGS. 1 and 2, where they are within easy reach by the operator.

In operation, the operator positions himself at the right side of the machine adjacent the control valves. The electric motor 118 is supplied with electric current by a cable from a source of electricity so that the motor 118 and the pumps 112, 114 and 116 operate continuously.

The pumps draw hydraulic fluid from the tank 120 and discharge it into fluid supply lines, and through pressure regulators, to the control valves 126, 128, 130, 132, 156, 158 and 176. The operator manipulates the valves as desired to allow fluid to flow through the valves to the cylinder members and the fluid motors.

When the valves are in closed position, the fluid will flow through the valves and back to the tank 120. When the valves are in open position the fluid will flow through the valves, then to the cylinder members and fluid motors, and then back to the tank 120.

To work the loading machine, the jib 50 is adjusted to the desired elevation by moving the valve 128 which controls the cylinders 60 and 62. The shovel 54 is lowered to the position shown in FIG. 1 by extending the cylinders 64 and 66 which are under the control of the valve 126. The entire loading machine is driven forward by the crawler treads 12 and 14, under the control of the valves 156 and 158, until the shovel penetrates the pile of material to be removed deep enough to obtain a shovel full.

The valve 126 is moved so that the cylinders 64 and 66 are retracted to pull the shovel 54 backwards whereupon the material is dumped onto the belt 82 and carried to the tail portion 78.

The belt 82, controlled by the valve 176, can be run continuously if there is a mine car or vehicle suitably positioned to receive the material when it falls off the rear of the conveyor. Otherwise, the belt can be loaded up and the machine can be driven in reverse to a location where the material can be discharged into a mine car, conveyor means, or the like.

The vertical angle of the conveyor 76 is controlled by the valve 132, and the vertical angle of the conveyor tail portion 78 is controlled by the valve 130. It may be necessary to adjust the disposition of the conveyor and tail portion to account for the height of the mine car or other means which receives the lading as it falls off the conveyor, or to account for the slopes of the surface over which the loading machine must travel.

The right-hand crawler tread and the left-hand crawler tread are operated in unison. The valve 156 controls the right-hand tread and the valve 158 controls the left-hand tread. In all respects the operation of the two treads is identical. By driving the right-hand tread forward, or the left hand tread backward, the machine will turn to the left. By driving the right-hand tread backward and the left-hand tread forward, the machine will turn to the right. The treads can be operated together for movement of the machine in a forward or backward direction or for turning.

The brake 40 on the gear reducer 20 and the brake 42 on the gear reducer 22 are applied automatically by spring means to brake the treads when they are not being operated. When fluid under pressure is supplied to the motors 16 or 18 to drive the treads, fluid is also supplied to the corresponding brake motor 44 and 46 to act against the spring means to release the corresponding brake.

When the loading machine is removing material, the selector valve 172 will be adjusted to direct fluid from the pump 116 to the motor 84 to drive the conveyor belt 82. When the machine is being moved to a new location, the selector valve can be adjusted to direct fluid from the pump 116 to the motors 16 and 18 to increase their rotational speed. This will increase the speed of the crawler treads and allow the machine to be transported faster.

One advantage of this invention is that the operation of the loading machine can be controlled completely by the manipulation of levers all of which are conveniently located within a compact space at one side of the loading machine. These levers which control the valves in the various fluid lines need not be large. They take up a relatively small amount of space and can be easily pushed or pulled by the operator.

Another advantage of this invention is that by operating such a loading machine completely by hydraulic means, it is possible to use relatively small, yet powerful fluid pressure operated cylinder devices and motors. In this connection it has been possible to construct a loading machine which is approximately 28 inches high, four and one-half feet wide, and sixteen feet long. The acceptance of such a relatively small yet versatile machine in the mining industry can be readily appreciated.

Another advantage of this invention is that the fluid pressure for operating the conveyor belt motor can be diverted to the crawler tread motors to increase the travelling speed of the loading machine. The machine constructed according to this invention has a travelling speed of approximately fifty-five feet per minute for operating, and eighty feet per minute for moving.

Still another advantage results from the provision of an inching-control device which eliminates the need for the operator to manually work the conveyor belt each time that material is dumped onto it. Furthermore, the belt can be filled along its entire length so that the machine can carry a maximum load during each trip that it makes from the point of loading to the point of discharge.

While the invention has been illustrated and described in one embodiment, it is recognized that variations and changes may be made therein, without departing from the invention as set forth in the claims.

I claim:

1. In a control system for a loading machine having crawler means for moving the loading machine and conveyor belt means for transferring material from one end of the loading machine to the other, first pump means, first fluid motor means in communication with said first pump means for driving the crawler means, second pump means, second fluid motor means in communication with said second pump means for driving the conveyor belt means, and valve means in communication with said second pump means, said first motor means, and said second motor means for directing fluid from said second pump means either to the first motor means or to the second motor means in order that the speed of the crawler means may be increased when the conveyor means is not transferring material.

2. In a control system for a loading machine, crawler means, fluid motor means for moving the loading machine for driving said crawler means, first pump means for supplying fluid under pressure through supply lines to said crawler motor means, conveyor belt means for transferring material from one end of the loading machine to the other, fluid motor means for driving said conveyor belt means, second pump means for supplying fluid under pressure through supply lines to said conveyor belt motor means, valve means in the line between said second pump means and said conveyor belt motor means and communicating with said crawler means for selectively directing the fluid from said second pump means either to the belt motor means or to the crawler motor means so that both the first pump means and the second pump means may supply fluid under pressure to the crawler motor means for increasing the speed at which the loading machine may be moved.

3. In a control system for a vehicle of the type described, crawler means for moving the vehicle, pump means for supplying fluid under pressure, first fluid motor means for driving the crawler means, conveyor means for transferring material from one end of the vehicle to the other, second fluid motor means for driving the conveyor means, first and second fluid pressure supply lines connecting said pump means to said first and said second motor means, respectively, and the valve means communicating with said pump means for selectively directing the fluid communicating with said pump means from the pump means into said first line to said first motor means for driving said crawler means when the conveyor means is not transferring material or into said second line to said second motor means for driving said conveyor means.

4. In a control system for a vehicle of the type described, crawler means for moving the vehicle, first and second pump means for supplying fluid under pressure, first fluid motor means for driving the crawler means, conveyor means for transferring material from one end of the vehicle to the other, second fluid motor means for driving the conveyor means, first and second fluid pressure supply lines connecting said first and said second pump means to said first and said second motor means, respectively, and valve means communicating with said second pump means for selectively directing the fluid from said second pump means either to said first or to said second motor means so that both the first pump means and the second pump means may supply fluid under pressure to the first motor means for increasing the speed at which the crawler means may move the vehicle when the conveyor means is not transferring material.

5. In a control system for a vehicle of the type described, first pump means for supplying fluid under pressure, cylinder means for operating a conveyor, a conveyor tail portion, a jib, and a shovel, fluid pressure supply lines connecting the first pump means to the cylinder means, second pump means for supplying fluid under pressure, fluid motor means for driving a crawler device for moving the vehicle, fluid pressure supply lines connecting the second pump means to the crawler motor means, third pump means for supplying fluid under pressure, fluid motor means for driving a conveyor belt for transferring material from one end of the vehicle to the other, fluid pressure supply lines connecting the third pump means to the conveyor belt motor means, valve means in the supply lines for controlling the flow of fluid, selector valve means in the supply line between the third pump means and the conveyor belt motor means for directing the flow of fluid from the third pump means either to the conveyor belt motor means or to the crawler motor means, and operating means connected to the valve means which controls the flow of fluid through the supply line to the conveyor belt motor means for operating said valve means in response to movement of said shovel.

6. In a control system for a loading machine, a conveyor belt extending substantially from one end of the loading machine to the other, pump means, fluid motor means in communication with said pump means for driving said conveyor belt, valve means between said pump means and said motor means for controlling the flow of fluid to said motor means, movable shovel means for loading material onto said conveyor belt, and means between said shovel means and said valve means for operating said valve means in response to movement of said shovel means to drive said conveyor belt when said shovel means moves to load material onto said conveyor belt.

7. In a control system for a loading machine, conveyor belt means extending substantially from one end of the loading machine to the other, fluid motor means for driving said belt means, valve means for controlling the flow of fluid to said motor means, shovel means swingable toward said belt means for loading said belt means, and cable means connected to said valve means and actuated in response to swinging movement of said shovel means, whereby said belt means is driven by said motor means when said shovel means loads said belt means and said belt means is stopped when not being loaded by said shovel means.

8. In a control system for a loading machine, conveyor belt means extending substantially from one end of the loading machine to the other, fluid motor means for driving said belt means, valve means for controlling the flow of fluid to said motor means, shovel means swingable toward said belt means for loading said belt means, cable means connected to said valve means for operating said valve means, means on said shovel means for engaging and moving said cable means so that said valve means can allow fluid to flow to said motor means to drive said belt means when said shovel means loads said belt means, and spring means associated with said cable means for moving said cable means so that said valve means prevents fluid from flowing to said motor means to stop said belt means when said shovel means is not loading said belt means.

References Cited in the file of this patent
UNITED STATES PATENTS

| | | |
|---|---|---|
| 2,103,530 | Henry | Dec. 28, 1937 |
| 2,437,629 | Whaley | Mar. 9, 1948 |
| 2,439,912 | Stoltz | Apr. 20, 1948 |
| 2,566,391 | Wertman et al. | Sept. 4, 1951 |
| 2,739,722 | Joy | Mar. 27, 1956 |